United States Patent
Miyamoto et al.

(10) Patent No.: US 11,286,367 B2
(45) Date of Patent: Mar. 29, 2022

(54) PELLET AND THERMOPLASTIC RESIN COMPOSITION

(71) Applicant: ASAHI KASEI KABUSHIKI KAISHA, Tokyo (JP)

(72) Inventors: Akira Miyamoto, Tokyo (JP); Keiko Motoyama, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 16/534,069

(22) Filed: Aug. 7, 2019

(65) Prior Publication Data

US 2020/0048424 A1    Feb. 13, 2020

(30) Foreign Application Priority Data

Aug. 7, 2018    (JP) .............................. JP2018-148555

(51) Int. Cl.
*C08K 3/04*    (2006.01)
*C08K 5/20*    (2006.01)

(52) U.S. Cl.
CPC . *C08K 3/04* (2013.01); *C08K 5/20* (2013.01)

(58) Field of Classification Search
CPC .. C08K 3/04; C08K 5/20; C08L 25/06; C08L 53/02; C08J 3/226; C08J 2371/12; C08J 2425/06; C08J 2325/06; C08J 2425/10; C08J 2325/10
See application file for complete search history.

(56) References Cited

U.S. PATENT DOCUMENTS

| | | |
|---|---|---|
| 6,200,509 B1 | 3/2001 | Neubauer et al. |
| 2004/0082729 A1 | 4/2004 | Terada et al. |
| 2011/0230611 A1 | 9/2011 | Asano et al. |
| 2013/0059962 A1 | 3/2013 | Terada |

FOREIGN PATENT DOCUMENTS

| | | | | |
|---|---|---|---|---|
| CN | 102216374 A | | 10/2011 | |
| CN | 102906164 A | | 1/2013 | |
| CN | 106893249 A | * | 6/2017 | |
| CN | 109438867 A | * | 3/2019 | |
| EP | 0370424 A2 | * | 5/1990 | ............... C08K 3/04 |
| JP | 2001198948 A | | 7/2001 | |
| JP | 2002519210 A | | 7/2002 | |
| JP | 2005171001 A | | 6/2005 | |
| JP | 2009197056 A | | 9/2009 | |
| JP | 2010180264 A | | 8/2010 | |
| JP | 2011026550 A | | 2/2011 | |
| JP | 2014101423 A | | 6/2014 | |
| JP | 2016138200 A | | 8/2016 | |
| JP | 2017061708 A | | 3/2017 | |
| WO | 2004060980 A1 | | 7/2004 | |

OTHER PUBLICATIONS

English Machine Translation of JP 2016-138200 (Year: 2016).*
English machine translation of CN 109438867 (Year: 2019).*
English machine translation of CN 106893249 (Year: 2017).*

* cited by examiner

*Primary Examiner* — Angela C Scott
(74) *Attorney, Agent, or Firm* — Kenja IP Law PC

(57) ABSTRACT

Provided is a carbon black master batch pellet for black coloring comprising a high concentration of carbon black, having an excellent dispersibility of the carbon black, and which can express a stable black coloring concentration with hardly any classification occurring even when mixed in the various raw materials of a thermoplastic resin composition. A pellet comprising 35 to 55 mass % of carbon black (A), 65 to 45 mass % of a thermoplastic resin (B), and 0 to 10 mass % of a dispersant assistant (C), wherein a diameter (D) in a direction orthogonal to the axial direction is 2 to 5 mm, and a ratio (D/L) of the diameter (D) to a length (L (mm)) in the axial direction is 3.0 to 1.5.

12 Claims, No Drawings

PELLET AND THERMOPLASTIC RESIN COMPOSITION

TECHNICAL FIELD

The present disclosure relates to a carbon master batch pellet used in the production of a thermoplastic resin composition.

BACKGROUND

Black coloring by melt-kneading carbon black for coloring is generally performed for the purpose of imparting light resistance, a light shielding property, a black appearance, etc., to a thermoplastic resin.

Carbon black powder for black coloring (hereinafter, referred to as the "raw carbon black") itself is usually a fine powder, and is light and has an easy scattering characteristic, thus, there is concern that the carbon black powder contaminates the working environment, and has adverse effects on the human body.

In order to solve these problems, black coloring of a thermoplastic resin may be performed by melt-kneading a raw carbon black in a thermoplastic resin at a high concentration (normally, the carbon black concentration is 30 to 55 mass %) and preparing a granule-shaped (fine particle) or a pellet-shaped carbon black master batch, and then, compounding the carbon black master batch in place of the raw carbon black using a melt-kneading device such as an extruder to perform melt-kneading (compounding) (for example, refer to JP 2016-138200A (PTL 1)).

Further, not only can the working environment be improved by using a carbon black master batch, but the dispersibility of the carbon black in a resin composition can be increased compared to the case when using a raw carbon black.

CITATION LIST

Patent Literature

PTL 1: JP 2016-138200A

SUMMARY

To increase the production efficiency, the thermoplastic resin composition generally can use a method in which a plurality of raw materials, for example, resin powders, resin pellets, fiber or powder fillers, liquid substances (resin flame retardants, etc.) are quantitatively fed separately to a melt-kneading device (the use of a twin screw extruder is preferable) via a plurality of various feeding devices, and melt-kneading is continuously performed. In this case, when black coloring is performed simultaneously, a method for performing the black coloring and the compounding simultaneously by premixing the raw carbon or the carbon black master batch in any raw material feed system and then feeding has been used (hereinafter, also referred to as "black coloring—simultaneous compounding").

When performing the black coloring—simultaneous compounding, the use of a carbon black master batch has a most preferable effect in improving the working environment. Normally, the carbon black master batch is used at 5 parts by mass or less, preferably 0.1 to 1 part by mass when the entire resin composition is made to 100 parts by mass, and premixing is performed using a tumbler or a premixer such as a high speed mixer to any of the plurality of raw materials and is supplied to the melt-kneading device (the use of a twin screw extruder is preferable) via various feeding devices. Further, when performing the black coloring—simultaneous compounding, the carbon master batch is preferably used in a pellet-shaped form from the viewpoint of the handling thereof.

However, there are the following problems with regards to the black coloring—simultaneous compounding which uses a pellet-shaped carbon black master batch.

Namely, when the pellet-shaped carbon black master batch was premixed in a "pellet-shaped" raw material system, as the carbon black master batch having a high concentration generally has the characteristic that the surface is slippery, a separation (hereinafter, the separation between the carbon master batch and other raw materials is also referred to as "classification") may occur between the carbon black master batch and another pellet raw material system in a raw material hopper so that an uneven concentration of the carbon black may be produced in the black coloring pellet after the black coloring—simultaneous compounding.

Further, in the case when the pellet-shaped carbon black master batch is premixed in a "powder" raw material system, the presence of a pellet-shaped carbon black master batch may influence the fluidity of the entire powder raw material, and a concentration unevenness of the carbon black may be produced.

In the actual black coloring—simultaneous compounding site, compounding is performed using a plurality of raw materials and continuously feeding to an extruder from a plurality of feeding devices, and the suitable feeding position changes even for the carbon master batch depending on factors such as the feeding order (for example, the feeding order and the feeding position become important when including reactive process factors) of the raw materials to the extruder, the raw material shape, the compounding ratio, and the supply accuracy of the feeding equipment. From the viewpoint of work efficiency, a carbon black master batch which can obtain a colored compound product having a constant black coloring concentration with hardly any classification occurring even when compounded in either a pellet-shaped raw material system or a powder raw material system is desired.

Furthermore, in various resin molded products (injection molded products, or extrusion molded products such as sheets and films, blow molded products, etc.) which are formed using black coloring compound products (pellet manufactured goods), when the dispersibility of the carbon black is poor, aggregates of carbon black appear on the surface of the molded product which may not only impair the external appearance, but may also bring about a reduction of the impact strength and a reduction of the breaking elongation, thus, it is basically required for the carbon black master batch that there are substantially no carbon black aggregates and that the dispersibility into the resin is high.

Further, since the carbon black master batch can reduce its compounded amount by the concentration of the carbon black being high, not only can the fluctuation of physical properties due to the black coloring of the resin composition be reduced, but it is preferable from the economic viewpoint.

With respect to such a background and the problems, it is the object of the present disclosure to provide a carbon black master batch pellet for black coloring comprising a high concentration of carbon black, having an excellent dispersibility of the carbon black, and which can express a stable black coloring concentration with hardly any classification occurring even when mixed in the various raw materials of a thermoplastic resin composition.

As a result of keen research for solving the aforementioned problems, we discovered that a carbon black master batch pellet for black coloring could be obtained, comprising a high concentration of carbon black, and having an excellent dispersibility of the carbon black, and which can express a stable black coloring concentration with hardly any classification occurring even when mixed in the various raw materials of a thermoplastic resin composition by making as a pellet containing a specific content of each of a carbon black, a thermoplastic resin, and a dispersant assistant and in which the diameter in the direction orthogonal to the axial direction and the ratio of the diameter to the length of the axial direction is in a specific range, and completed the present disclosure.

That is, the present disclosure is as follows.

[1] A pellet comprising
35 to 55 mass % of carbon black (A),
65 to 45 mass % of a thermoplastic resin (B), and
0 to 10 mass % of a dispersant assistant (C), wherein
a diameter (D) in a direction orthogonal to the axial direction is 2 to 5 mm, and a ratio (D/L) of the diameter (D) to a length (L (mm)) in the axial direction is 3.0 to 1.5.

[2] The pellet according to [1], wherein
the carbon black (A) has a primary particle diameter of 10 to 30 nm, and an oil absorption amount of 50 to 150 mL/100 g.

[3] The pellet according to [1] or [2], wherein
the thermoplastic resin (B) is a styrene resin.

[4] The pellet according to any one of [1] to [3], wherein
the dispersant assistant (C) is an aliphatic amide.

[5] A thermoplastic resin composition obtainable by melt-kneading a raw material comprising the thermoplastic resin and the pellet according to any one of [1] to [4], wherein the content of the pellet is 0.01 to 5 mass %.

[6] The thermoplastic resin composition according to [5] comprising a polyphenylene ether resin.

[7] A method of producing a thermoplastic resin composition comprising feeding a powder resin raw material and/or a pellet-shaped resin raw material from a plurality of raw material feed systems to a melt-kneading device to continuously perform melt-kneading, wherein the pellet according to any one of [1] to [4] is added in advance to at least one of the plurality of raw material feed systems.

Advantageous Effect

The present disclosure can provide a carbon black master batch pellet for black coloring comprising a high concentration of carbon black, and having an excellent dispersibility of the carbon black, which can express a stable black coloring concentration with hardly any classification occurring even when mixed in the various raw materials of a thermoplastic resin composition.

DETAILED DESCRIPTION

The following provides a detailed description of an embodiment of the present disclosure (hereinafter, also referred to as the "present embodiment"). Note that, the following is an explanation for describing the present disclosure, and the present disclosure is not limited to the following embodiment and may be implemented with various alterations that are within the essential scope thereof.

[Pellet]
The pellet of the present embodiment contains 35 to 55 mass % of carbon black (A), 65 to 45 mass % of a thermoplastic resin (B), and 0 to 10 mass % of a dispersant assistant (C), wherein the diameter (D) in the direction orthogonal to the axial direction is 2 to 5 mm, and the ratio (D/L) of the diameter (D) to the length (L (mm)) in the axial direction is 3.0 to 1.5.

The pellet of the present embodiment is preferably a carbon black master batch (hereinafter, simply referred to as the "master batch") for producing a thermoplastic resin composition.

—Carbon Black (A)—

From the viewpoints of black coloring power and the dispersibility, the carbon black (A) (hereinafter, simply referred to as "Component (A)") used in the mater batch pellet of the present embodiment preferably has a primary particle diameter of 10 to 70 nm, more preferably 12 to 50 nm, even more preferably 14 to 40 nm, and most preferably 16 to 30 nm. The primary particle diameter of the carbon black (A) is preferably 70 nm or less in order to obtain a black colorability close to a jet-black tone, and, is preferably 10 nm or more from the viewpoint of the dispersibility of the carbon black.

Note that, in the present disclosure, the primary particle diameter of the carbon black (A) can be measured by observation using an electron microscope.

The nitrogen adsorption specific surface area of the carbon black (A) is preferably 50 to 600 $m^2/g$, more preferably 70 to 400 $m^2/g$, even more preferably 80 to 350 $m^2/g$, and most preferably 100 to 300 $m^2/g$. The nitrogen adsorption specific surface area is preferably 600 $m^2/g$ or less in order to increase the dispersibility of the carbon black, and is preferably 50 $m^2/g$ or more from the viewpoint of aggregation prevention.

Note that, in the present disclosure, the nitrogen adsorption specific surface area of the carbon black (A) can be obtained by the BET method in accordance with JIS-6217-2.

The oil absorption amount of the carbon black (A) is preferably 30 to 250 mL/100 g, more preferably 40 to 200 mL/100 g, and most preferably 50 to 150 mL/100 g. The oil absorption amount of the carbon black (A) is preferably 250 mL/100 g or less from the viewpoint of the dispersibility of the carbon black, and is preferably 30 mL/100 g or more from the viewpoint of aggregation prevention.

Note that, in the present disclosure, the oil absorption amount of the carbon black (A) can be measured in accordance with JIS-6217-4.

The pH of the carbon black (A) is preferably 6 to 8, and the volatile content is preferably 0 to 3%.

The content of the carbon black (A), based on 100 mass % of the master batch pellet, is 35 to 55 mass %, preferably 38 to 52 mass %, even more preferably 40 to 50 mass %, and most preferably 42 to 46 mass %. The content of the carbon black (A) is preferably 35 mass % or more in order to prevent self-aggregation of the carbon black, and is preferably 55 mass % or less from the viewpoint of increasing the dispersibility of the carbon black.

In the master batch pellet of the present embodiment, the carbon black (A) may be used individually, or two or more may be used in combination.

—Thermoplastic Resin (B)—

The thermoplastic resin (B) (hereinafter, simply referred to as the "Component (B)") used in the master batch pellet of the present embodiment may be the same or a different resin as the thermoplastic resin contained in the raw materials of thermoplastic resin compositions other than the master batch pellet, and when it is a different resin, it is preferable to use a thermoplastic resin in which the compatibility with other thermoplastic resins is high.

In the present embodiment, an example of the thermoplastic resin (B) contained in the master batch pellet used in the polyphenylene ether resin composition described later which is preferable as a thermoplastic resin composition is preferably a styrene resin such as homopolystyrene (GPPS) and high impact polystyrene (HIPS), specifically, and in order to improve the external appearance of the manufactured goods GPPS is most preferable.

The content of the thermoplastic resin (B), based on 100 mass % of the master batch pellet, is 65 to 45 mass %, preferably 60 to 48 mass %, and even more preferably 55 to 50 mass %. The content of the thermoplastic resin (B) is preferably 45 mass % or more in order to increase the dispersibility of the carbon black, and is preferably 65 mass % or less from the viewpoint of preventing the self-aggregation of the carbon black.

The thermoplastic resin (B) may be used individually, or two or more may be used in combination in the master batch pellet of the present embodiment.

—Dispersant Assistant (C)—

The master batch pellet of the present embodiment can not only suppress the reduction of the external appearance of the surface (deterioration of the external appearance of the surface due to granular aggregates) of the final product by making the dispersibility of the carbon black (A) in the thermoplastic resin good, and furthermore, preventing the self-aggregation of the carbon black (A), but furthermore, a dispersant assistant (C) (hereinafter, simply referred to as the "Component (C)") may be included with the aim of improving the tensile elongation at break and the impact strength.

The dispersant assistant (C) is not specifically limited, but, for example, a dispersant assistant having the molecular structural characteristics of a molecular weight of 500 or less, easily melting and softening, having a hydrophobic unit of the alkyl chain and a hydrophilic unit consisting of a polar group, and preferably has the characteristics that the compatibility with a thermoplastic resin is high, and bleeding out to the surface is unlikely to occur.

Examples of such a dispersant assistant (C) include waxes such as fatty acid metal salts, fatty acid esters, and fatty acid amides. Thereamong, fatty acid amides are preferred for the effect thereof, and specifically, a bisamide based aliphatic amide represented by ethylene bis stearylamide is most preferable.

The content of the dispersant assistant (C), based on 100 mass % of the master batch pellet, is 0 to 10 mass %, preferably 0.1 to 8 mass %, even more preferably 1 to 7 mass %, and most preferably 2 to 5 mass %. The content of the dispersant assistant (C) is preferably 10 mass % or less from the viewpoint of mold deposit.

The dispersant assistant (C) may be used individually, or two or more may be used in combination in the master batch pellet of the present embodiment.

—Additives—

Further, additives may be added in order to impart the desired characteristics to the master batch pellet of the present embodiment along with the aforementioned thermoplastic resin (B).

For example, plasticizers, stabilizers such as antioxidants and ultraviolet absorbers, antistatic agents, dyes and pigments, resins other than the thermoplastic resin (B), and the like may be provided as the aforementioned additives.

The content of the additives in the master batch pellet of the present embodiment is not specifically limited as long as the object of the present disclosure is not inhibited, and the total content of Components (A), (B), and (C) is made to a range of 95 mass % or more relative to 100 mass % of the master batch pellet, that is, is preferably less than 5 mass %.

[[Method of Producing Master Batch Pellet]]

The master batch pellet of the present embodiment can be obtained by melt-kneading the aforementioned Component (A) and Component (B) with Component (C) and the additives in accordance with need, and then, cutting the obtained melt-kneaded product into a predetermined shape.

In order to obtain a superior carbon black dispersibility, it is important to make the contents of Component (A), Component (B), and Component (C) to a specific range in the melt-kneading process, and furthermore, it is preferable to adjust the set temperature and the kneading time during melt kneading to the ranges described below.

A kneader, a Banbury mixer, a roller, an extruder and the like may be provided as the melt-kneading device, but a kneader is preferably used in order to obtain a master batch pellet having a high concentration of carbon black and a high dispersibility.

Normally, the melt-kneading is preferably conducted at 170 to 230° C., and, specifically, when using a kneader as the melt-kneading device, normally, the kneading time is preferably 5 to 40 minutes.

In the cutting process for cutting the obtained melt-kneaded product to a predetermined shape, first, the obtained molten mixture is extruded from, for example, a die opening using an extrusion pelletizer equipped with a die in a molten state, preferably, in a state prior to the cooling of the obtained molten mixture. The extrusion direction of the melt-kneaded product by the extrusion pelletizer is normally, the axial direction of the pellet. Next, the master batch pellet can be obtained by continuously cutting the melt-kneaded product extruded via the die opening so as to be the predetermined shape, and immediately cooling. Note that, the melt-kneaded product can be cut immediately after being obtained as a strand via the die opening, but extruding from the die and immediately cutting is preferable from the viewpoint of efficiently obtaining the master batch pellet.

[[Shape of Master Batch Pellet]]

The master batch pellet of the present embodiment is a pellet obtainable by, for example, the aforementioned production method, and the pellet has a diameter (D) in the direction orthogonal to the axial direction of 2 to 5 mm, and has a ratio (D/L) of the diameter (D) to the length (L (mm)) of the pellet measured along the axial direction of 3.0 to 1.5.

When the diameter (D) is in excess of 5 mm, the stability of the raw material feed of various processers of the thermoplastic resin composition may be impaired. Further, when the diameter (D) is less than 2 mm, classification may occur between the master batch pellet of the present embodiment and another pellet-shaped raw material system in a raw material hopper in the case when the master batch pellet of the present embodiment is premixed in the pellet-shaped raw material system.

Further, when the ratio (D/L) of the diameter (D) to the length (L) is in excess of 1.5, the classification of the master batch pellet is suppressed due to the unique shape thereof even when used and pre-mixed with any of powder or pellet-shaped raw material systems, and when the ratio (D/L) is less than 3.0, it is possible to stabilize the continuous feeding of the master batch pellets to the extruder, and it is possible to obtain a black colored thermoplastic resin composition having a stable coloring concentration.

Here, the ratio (D/L) is preferably 2.8 to 1.7, and more preferably 2.5 to 1.9. Further, the diameter (D) is preferably 2.5 to 4.5 mm, and more preferably 3.0 to 4.0 mm.

Further, the length (L) measured along the axial direction of the pellet is preferably 0.67 to 2.7 mm, more preferably 0.7 to 2.5 mm, and even more preferably 1.0 to 2.0 mm.

Note that, "the diameter (D) of the pellet in the direction orthogonal to the axial direction" (hereinafter, referred to as the "pellet diameter (D)") is a value which arithmetically averaged the measured values of ten master batch pellets which were arbitrarily selected. The "diameter of the pellet in the direction orthogonal to the axial direction" with regards to one master batch pellet is a value obtained by measuring the diameter (length) of three or more locations including the maximum and minimum for the projection obtained by projecting the pellet from the axial direction to the plane orthogonal to the axial direction of the pellet, and arithmetically averaging the obtained values. Note that, when there was difficulty in specifying the axial direction of the pellet, the diameter of one pellet can be obtained by determining the vertical direction when placed on the horizontal plane as the axial direction of the pellet for two respective cut surfaces of the pellet and measuring the diameter of the orthogonal direction, and arithmetically averaging the values obtained for each.

Further, the "length (L) of the pellet measured along the axial direction" of the pellet (hereinafter, referred to as the "pellet length (L)") is a value which arithmetically averaged the measured values in the ten pellets used to calculate the aforementioned pellet diameter (D). The "length of the pellet measured along the axial direction" with regards to one master batch pellet is the value measured along the axial direction from one end of the axial direction of the pellet to the other end of the axial direction, and for example, is a value which can be obtained by measuring the projection obtained by projecting the pellet from the direction orthogonal to the axial direction of the pellet along the axial direction from one end to the other end in the axial direction. Note that, when there was difficulty in specifying the axial direction of the pellet, the length of one pellet can be obtained by making the vertical direction when placed on the horizontal plane as the axial direction of the pellet for two respective cut surfaces of the pellet, and arithmetically averaging the values measured along the axial direction from one end of the axial direction of the pellet to the other end of the axial direction for the two respective cut surface.

Here, the shape of the pellet may be a column, for example, a circular column, an elliptical column, or a polygonal column. As stated above, the pellet has a ratio of the pellet diameter (D) to the pellet length (L) of 3.0 to 1.5, thus, for example, if the pellet is a columnar shape, the higher the ratio, the closer it is to being a disc shape, but even in this case, the axial direction refers to the direction along the central axis of a columnar body (a columnar body having a low height) that has a disc shape.

Further, the pellet, as described in the aforementioned method of producing of the master batch pellet, can be obtained by cutting the melt-kneaded product into a pellet-shape, and when cut prior to the solidification of the melt-kneaded product, the corners of the pellet after cutting may be rounded and solidified, and therefore, the surface, sides and corners of the pellet may be rounded. Further, when producing a master batch pellet, if the pellet is columnar, the upper and lower surfaces of the pellet can be made as the cutting surface produced by cutting the melt-kneaded product into pellets.

Further, the pellet preferably has a ratio of the minimum length to the maximum length of the projection of 50% or more, more preferably 60% or more, and even more preferably 70% or more in the aforementioned projection (the projection obtained by projecting the pellet from the axial direction to the plane orthogonal to the axial direction of the pellet) obtained in order to obtain "the diameter (D) of the pellet in the direction orthogonal to the axial direction".

[Thermoplastic Resin Composition]

The thermoplastic resin composition of the present embodiment contains the thermoplastic resin and the aforementioned master batch pellet of the present embodiment, and is obtainable by melt-kneading them, and is a thermoplastic resin composition colored black by the master batch pellet of the present embodiment.

The content of the master batch pellet in the thermoplastic resin composition of the present embodiment, based on 100 mass % of the resin composition, is preferably 0.01 to 5 mass %, more preferably 0.05 to 5 mass %, even more preferably 0.08 to 3 mass %, even more preferably 0.1 to 2 mass %, and most preferably 0.2 to 1 mass %. From the viewpoint that the resin composition obtains a sufficient degree of black coloring, 0.01 mass % or more is preferable, and from the viewpoint of maintaining the external appearance (suppression of the occurrence of silver streaks) of the molded product, 5 mass % or less is preferable.

—Thermoplastic Resin—

The thermoplastic resin contained in the thermoplastic resin composition of the present embodiment includes the thermoplastic resin (B). A resin which is plasticized and melted by heating and used for molding is indicated as such a thermoplastic resin, and is not specifically limited, but, for example, polyethylene (HDPE, MDPE, LDPE, and LLDPE), polypropylene (PP), polyvinyl chloride (PVC), polyvinylidene chloride, polystyrene (PS), polyvinyl acetate (PVAc), polyurethane (PUR), fluorinated resin, acrylonitrile butadiene styrene resin (ABS), AS resin, acrylate resin (PMMA), polyamide (PA), polyacetal (POM), polycarbonate (PC), polyphenylene ether (PPE), modified polyphenylene ether (m-PPE, modified PPE, PPO), polyester (PEs) (polyethylene terephthalate (PET), glass fiber reinforced polyethylene terephthalate (GF-PET), polybutylene terephthalate (PBT), etc.), cyclic polyolefin (COP), polyphenylene sulfide (PPS), polysulfone (PSF), polyether sulfone (PES), polyarylate (PAR), liquid crystal polymer (LCP), polyether ether ketone (PEEK), thermoplastic polyimide (PI), polyamide imide (PAI) and the like may be provided.

The thermoplastic resin may be used individually, or two or more may be used in combination.

Thereamong, the thermoplastic resin is preferably a polyphenylene ether resin, and the aforementioned master batch pellet of the present embodiment can be preferably used for the purpose (specifically, black coloring—simultaneous compounding) of coloring the polyphenylene ether resin composition comprising the polyphenylene ether resin black.

[[Polyphenylene Ether Resin Composition]]

The polyphenylene ether resin composition containing the aforementioned polyphenylene ether resin can include a polyphenylene ether ($\alpha$), a styrene resin ($\beta$), and a styrene thermoplastic elastomer ($\gamma$) described below as components.

—Polyphenylene Ether ($\alpha$)—

The polyphenylene ether ($\alpha$) (hereinafter, simply referred to as the "Component ($\alpha$)") used in the present embodiment is not specifically limited, and may be a homopolymer of phenylene ether, or may be a copolymer of phenylene ether and another monomer.

The polyphenylene ether ($\alpha$) may be used individually, or two or more may be used in combination.

The polyphenylene ether ($\alpha$) is not specifically limited, and for example, a homopolymer consisting of a repeating unit structure represented by the following formula (1), and/or a copolymer having the repeating unit structure represented by the following formula (1) may be provided.

Formula 1

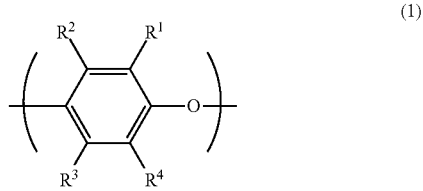

(1)

[in the formula, $R^1$, $R^2$, $R^3$, and $R^4$ are each independently of one another, a monovalent group selected from the group consisting of a hydrogen atom, a halogen atom, a primary alkyl group having a carbon number of 1 to 7, a secondary alkyl group having a carbon number of 1 to 7, a phenyl group, a haloalkyl group, an aminoalkyl group, a hydrocarbonoxy group, and a halohydrocarbonoxy group in which a halogen atom is separated from an oxygen atom at least by two carbon atoms.]

This kind of polyphenylene ether (α) is not specifically limited, and a well-known polyphenylene ether can be used. As specific examples of the polyphenylene ether (α), for example, homopolymers such as poly(2,6-dimethyl-1,4-phenylene ether), poly(2-methyl-6-ethyl-1,4-phenylene ether), poly(2-methyl-6-phenol-1,4-phenylene ether), and poly(2,6-dichloro-1,4-phenylene ether); copolymers such as a copolymer of 2,6-dimethyl-phenol and 2,3,6-trimethylphenol, 2-methyl-6-butylphenol or another phenol: and the like may be provided. Thereamong, poly(2,6-dimethyl-1,4-phenylene ether), and the copolymer of 2,6-dimethyl-phenol and 2,3,6-trimethylphenol are preferable, and poly(2,6-dimethyl-1,4-phenylene ether) is more preferable.

The method of producing the polyphenylene ether (α) is not specifically limited, and a conventionally well-known method can be used. As specific examples of the method of producing the polyphenylene ether (α), for example, the method described in U.S. Pat. No. 3,306,874 A in which a complex of cuprous salt and amine is used as a catalyst to produce, for example, 2,6-xylenol by oxidative polymerization, the methods described in U.S. Pat. Nos. 3,306,875 A, 3,257,357 A, 3,257,358 A, JP S52-17880 B, JP S50-51197 A, JP S63-152628 A and the like may be provided.

Further, the polyphenylene ether (α) may include various other phenylene ether units other than the aforementioned Formula (1) as a partial structure without departing from the desired effect of the present disclosure.

The various other phenylene ether units other than the aforementioned Formula (1) are not limited to the following, but, for example, the 2-(dialkylaminomethyl)-6-methylphenylene ether unit and the 2-(N-alkyl-N-phenylaminomethyl)-6-methylphenylene ether unit described in JP H01-297428 A and JP S63-301222 A may be provided.

Further, a repeating unit derived from diphenoquinone or the like may be bonded in the main chain of the polyphenylene ether (α) in a small amount.

Furthermore, the polyphenylene ether (α) may also have a structure in which some or all of the constitutional units constituting the polyphenylene ether were substituted with a functionalized polyphenylene ether, for example, by reacting (modifying) with a functionalizing agent containing at least one selected from the functional groups consisting of an acyl group (for example, a carboxyl group, an acid anhydride group, an acid amide group, an imide group, or a group derived from a carboxylic acid ammonium salt), an amine group, an orthoester group, and a hydroxy group.

The ratio (Mw/Mn value) of the weight-average molecular weight Mw and the number-average molecular weight Mn of the polyphenylene ether (α) is preferably 2.0 to 5.5, more preferably 2.5 to 4.5, and even more preferably 3.0 to 4.5. The Mw/Mn value is preferably 2.0 or more from the viewpoint of molding processability of the resin composition, and is preferably 5.5 or less from the viewpoint of the mechanical properties of the resin composition.

Note that, in the present disclosure, the weight average molecular weight Mw and the number average molecular weight Mn can be obtained from the polystyrene-equivalent molecular weights through measurement by gel permeation chromatography (GPC).

Further, the reduced viscosity of the polyphenylene ether (α) is preferably in the range of 0.25 to 0.55 dL/g, more preferably 0.25 to 0.45 dL/g, even more preferably 0.30 to 0.42 dL/g, and most preferably in the range of 0.30 to 0.40 dL/g. The reduced viscosity of the polyphenylene ether (α) is preferably 0.25 dL/g or more from the viewpoint of adequate mechanical properties of the resin composition, and is preferably 0.55 dL/g or less from the viewpoint of the molding processability.

Note that, in the present disclosure, the reduced viscosity can be measured by an Ubbelohde-type viscometer at a temperature of 30° C. using a 0.5 g/dL chloroform solution.

The content of the polyphenylene ether (α) used in the present embodiment, based on 100 mass % of the resin composition, is preferably 5 to 95 mass %, more preferably 10 to 90 mass %, and even more preferably 20 to 85 mass %. The content of the polyphenylene ether (α) is preferably 5 mass % or more from the viewpoint of the heat resistance that is required in the application of the resin composition, and preferably 95 mass % or less from the viewpoint of the retention of the appearance and the brightness feeling of the molded product.

—Styrene Resin (β)—

The styrene resin (β) (hereinafter, simply referred to as the "Component (β)") which may be included as a component of the polyphenylene ether resin composition of the present embodiment is a polymer obtained through polymerization of a styrene compound, or in accordance with need, a styrene compound and a compound which is copolymerizable with the styrene compound, in the presence or absence of a rubbery polymer.

The styrene resin (β) may be used individually, or two or more may be used in combination.

By adding this kind of Component (β) to the polyphenylene ether (α), it is possible to increase the melt fluidity during molding without reducing the heat resistance of the resin composition, and it is possible to enhance the external appearance of the molded product.

The styrene resin (β) is not limited to the following, but, for example, homopolystyrene, rubber-reinforced polystyrene (HIPS), styrene-acrylonitrile copolymer (AS resin), styrene-rubbery polymer-acrylonitrile copolymer (ABS resin) and the like may be provided. Thereamong, the styrene resin (β) preferably includes at least one type selected from the group consisting of homopolystyrene and styrene-acrylonitrile copolymer (AS resin).

The styrene compound is not limited to the following, but, for example, styrene, α-methylstyrene, 2,4-dimethylstyrene, monochlorostyrene, p-methylstyrene, p-tert-butylstyrene and ethylstyrene and the like may be provided, and styrene is preferable.

The compound which is copolymerizable with the aforementioned styrene compound is not limited to the following, but, for example, (meth)acrylate esters such as methyl methacrylate and ethyl methacrylate; unsaturated nitrile compounds such as acrylonitrile and methacrylonitrile; and acid anhydrides such as maleic anhydride may be provided.

The usage amount of the compound which is copolymerizable with the styrene compound, when the total amount of the styrene compound and the compound copolymerizable with the styrene compound are made as 100 mass %, is preferably 20 mass % or less and more preferably 15 mass % or less.

From the viewpoint of improving the impact resistance and the like, the styrene resin ($\beta$) may also include a rubbery polymer such as butadiene polymer or isoprene polymer.

The rubbery polymer is not limited to the following, but, for example, a conjugated diene rubber, a copolymer of a conjugated diene and an aromatic vinyl compound, an ethylene-propylene copolymer rubber and the like may be provided. Specifically, polybutadiene and styrene-butadiene copolymer are preferable.

Further, when using an unsaturated rubbery polymer, it is preferable to use a partially hydrogenated polybutadiene having a degree of unsaturation of 80 to 20%, or a polybutadiene containing 90% or more of a 1,4-cis bond.

In the polyphenylene ether resin composition of the present embodiment, from the viewpoint of improving the molding processability and the external appearance of the molded product, the styrene resin ($\beta$) is preferably contained in an amount of 2 to 95 mass %, more preferably 3 to 70 mass %, even more preferably 3 to 60 mass %, and even more preferably 5 to 50 mass % based on 100 mass % of the polyphenylene ether resin composition. The content of the styrene resin ($\beta$) is preferably 50 mass % or less when heat resistance is required, and is preferably 3 mass % or more from the viewpoint of improving the molding fluidity of the molded product and the like.

—Styrene Thermoplastic Elastomer ($\gamma$)—

From the viewpoint of improving the impact resistance of the resin composition, the polyphenylene ether resin composition of the present embodiment preferably comprises the styrene thermoplastic elastomer ($\gamma$) (hereinafter, simply referred to as the "Component ($\gamma$)").

The styrene thermoplastic elastomer ($\gamma$) is a hydrogenated substance of a block copolymer (hereinafter, also referred to as the "styrene block-conjugated diene compound block copolymer") comprising a styrene block and a conjugated diene compound block.

The styrene thermoplastic elastomer ($\gamma$) may be used individually, or two or more may be used in combination.

From the viewpoint of heat stability, the conjugated diene compound block is preferably that in which the unsaturated bonds derived from the conjugated diene compound are hydrogenated at a hydrogenation rate of 50% or more. The hydrogenation rate is more preferably 80% or more, and still more preferably 95% or more.

Note that, the hydrogenation rate can be obtained by, for example, using a nuclear magnetic resonance (NMR) spectrometer.

The conjugated diene compound block is not limited to the following, but, for example, polybutadiene, polyisoprene, poly(ethylene-butylene), poly(ethylene-propylene), vinyl-polyisoprene and the like may be provided.

The conjugated diene compound block may be used singly or in combinations of two or more.

The form of the arrangement of the repeating units constituting the block copolymer may be a linear type or a radial type. Further, the block structure constituted by a styrene block and a conjugated diene compound block may be any of di-block type, tri-block type and tetra-block type. Thereamong, the block copolymer of a tri-block linear type constituted by a polystyrene-poly(ethylene-butylene)-polystyrene structure is preferable from the viewpoint of the ability to sufficiently exhibit the desired effects of the present disclosure. Note that, a butadiene unit may be contained in the range which does not exceed 30 mass % in a conjugated diene compound block.

In the resin composition of the present embodiment, the content of Component ($\gamma$), based on 100 mass % of the polyphenylene ether resin composition, is preferably 5 to 40 mass %, more preferably 5 to 20 mass %, and even more preferably 5 to 15 mass %. The content of Component ($\gamma$) is preferably 5 mass % or more from the viewpoint of imparting impact resistance, and is preferably 40 mass % or less from the viewpoint of adequate heat resistance and the retention of rigidity.

——Additives——

Further, additives may be added to the thermoplastic resin composition of the present embodiment to impart the desired properties to the aforementioned thermoplastic resin.

Examples of the aforementioned additives include plasticizers, stabilizers such as antioxidants and ultraviolet absorbers, antistatic agents, dyes and pigments, inorganic fillers, and other resins.

The thermoplastic resin composition of the present embodiment preferably contains an appropriate amount of heat stabilizers from the viewpoint of the heat stabilization effect. The type of heat stabilizer is preferably a hindered phenol-based or a phosphorus-based heat stabilizer.

Specific examples of the hindered phenol-based heat stabilizer include 3,3',3",5,5',5"-hexa-tert-butyl-a,a',a"-(mesitylene-2,4,6-triyl)tri-p-cresol, 1,3,5-tris(3,5-di-tert-butyl-4-hydroxybenzyl)-1,3,5-triazine-2,4,6 (1H,3H,5H)-trione.

Specific examples of the phosphorus-based heat stabilizer include bis(2,4-dicumylphenyl)pentaerythritol diphosphite, and 3,9-bis(2,6-di-tert-butyl-4-methylphenoxy)-2,4,8,10-tetraoxa-3,9-diphosphaspiro[5,5]undecane.

Further, the thermoplastic resin composition of the present embodiment preferably includes an inorganic filler. Generally, the inorganic filler is not specifically limited as long as the inorganic filler is used in the reinforcement of the thermoplastic resin, and examples thereof include glass fiber, carbon fiber, glass flake, talc, mica and the like.

The content of the additives in the resin composition of the present embodiment, based on 100 mass % of the polyphenylene ether resin composition, may be made to 70 mass % or less.

[[Method of Producing the Thermoplastic Resin Composition]]

The method of producing thermoplastic resin composition of the present embodiment is not specifically limited, and a well-known method can be used.

As a preferable example, for example, the method of producing thermoplastic resin composition which feeds the powder resin raw material and/or the pellet-shaped resin raw material from the plurality of raw material feed systems to the melt-kneading device to continuously perform melt-kneading, wherein the master batch pellet of the present embodiment is added in advance to at least one of the plurality of raw material feed systems may be provided.

Specifically, for example, in the case of the aforementioned polyphenylene ether resin composition, the polyphenylene ether (α), the styrene resin (β), and the master batch pellet of the present embodiment, with the styrene thermoplastic elastomer (γ) and the additives in accordance with need were made as the raw material, and these raw materials were fed from the plurality of raw material feed systems to the melt-kneading device. In this case, the master batch pellet of the present embodiment was premixed in the feed system containing the polyphenylene ether (α), the master batch pellet of the present embodiment was premixed in the feed system containing the pellet raw material such as the styrene resin (β) or the styrene thermoplastic elastomer (γ), etc., and the master batch pellet of the present embodiment was added in advance to at least one raw material feed system. By continuously melt-kneading these raw materials fed from each raw material feed system with the melt-kneading device, the polyphenylene ether resin composition can be produced.

The melt-kneader for performing melt-kneading is not specifically limited, but a twin-screw extruder is most preferable.

Melt-kneading under the conditions of a cylinder set temperature of the twin screw extruder of 270 to 340° C., a screw speed of 150 to 450 rpm, and a vent vacuum degree of 11.0 to 1.0 kPa is provided as a preferred production example.

[Molded Product]

The molded product of the present embodiment can be obtained by molding the aforementioned thermoplastic resin composition of the present embodiment.

[[Method of Producing the Molded Product]]

A conventionally well-known method can be used as the method of producing of the molded product used in thermoplastic resin composition of the present embodiment and is not specifically limited, and suitably includes, for example, injection molding, extrusion molding, vacuum molding, and pressure air molding, and specifically, the use of injection molding is more preferable from the viewpoints of the external appearance and the brightness feeling of the molded product.

EXAMPLES

The present embodiment will be further described below by the examples and the comparative example, but the present embodiment is not only limited to these examples.

The measurement method and the raw material used in the examples and the comparative examples are described below.

[Measurement Method of the Physical Properties]
<Measurement of the Pellet Diameter (D) and the Pellet Length (L) of the Carbon Black Master Batch Pellet>

Ten carbon black master batch pellets were arbitrarily selected, and the diameter in the direction orthogonal to the axial direction and the length of the axial direction of the respective pellets were measured. The pellet diameter (D) and the pellet length (L) were obtained by arithmetically averaging the respectively obtained measurement values.

The diameter in the direction orthogonal to the axial direction of each pellet was obtained by measuring the diameter (length) at three or more locations including the maximum and the minimum for the projection obtained by projecting the pellet from the axial direction to the plane orthogonal to the axial direction of the pellet, and arithmetically averaging the obtained values. Note that, regarding when there was difficulty in specifying the axial direction of the pellet, the diameter of the pellet could be obtained for two respective cut surfaces of the pellet by determining the vertical direction when placed on the horizontal plane as the axial direction of the pellet and measuring the diameter of the orthogonal direction, and arithmetically averaging the respectively obtained values.

Further, the length of the axial direction of each pellet was obtained by measuring (measuring the projection obtained by projecting the pellet from the direction orthogonal to the axial direction of the pellet along the axial direction from one end to the other end in the axial direction) along the axial direction from one end of the axial direction of the pellet to the other end of the axial direction. Note that, when there was difficulty in specifying the axial direction of the pellet, the length of one pellet could be obtained by making the vertical direction when placed on the horizontal plane as the axial direction of the pellet for two respective cut surfaces, and arithmetically averaging the values measured along the axial direction from one end of the axial direction of the pellet to the other end of the axial direction for the two respective cut surfaces.

<Evaluation of External Appearance of the Molded Product>

(1) Change of Black Concentration

The resin compositions were classified into three types of (Division 1) Resins obtained immediately after the start of the black coloring—simultaneous compounding, (Division 2) Resins obtained after 30 minutes has elapsed from the start, and (Division 3) Resins obtained after 60 minutes has elapsed from the start. The Divisions 1 to 3 were used to mold the respective molded products according to the method described in the [[Method of producing the molded product]] section which will be described later. The black external appearance of the molded products was visually observed and compared.

[Evaluation Criteria]

Good: There was almost no change in the black concentration between the molded products of Divisions 1, 2, and 3.

Satisfactory: Changes in the black concentration were slightly observed between the molded products of Divisions 1, 2, and 3.

Poor: Changes in the black concentration were clearly recognized between the molded products of Divisions 1, 2, and 3.

In the aforementioned evaluation ranking, the carbon black master batches from which good and satisfactory molded products could be obtained were determined to be more suitable for use in the applications of the present disclosure.

(2) Observation of Carbon Black Aggregates on the Surface of the Molded Product

The surface of the flow-end portion of the molded products obtained by the method described in the [[Method of producing the molded product]] section which will be described later was observed, and the presence or absence of carbon black aggregates was visually observed.

[Evaluation Criteria]

Good: Carbon black aggregates cannot be seen (or are hardly noticeable).

Satisfactory: Some carbon black aggregates can be seen.

Poor: The occurrence of carbon black aggregates is large.

In the aforementioned evaluation ranking, the carbon black master batches from which good and satisfactory molded products could be obtained were determined to be more suitable for use in the applications of the present disclosure.

<Tensile Elongation Evaluation>

After drying the pellets of the thermoplastic resin compositions produced in the examples and the comparative examples at 100° C. for 2 hours, an IS-100GN injection molding machine (manufactured by Toshiba Machine Co., Ltd., set at a cylinder temperature of 280° C. and a mold temperature of 80° C.) was used to prepare a dumbbell test piece and perform a tensile test according to ISO527 standards, and the tensile elongation at break (TE) [units: %] was measured. The tensile speed was 5 mm/min.

[Raw Materials]
<Raw Materials of Carbon Black Master Batch Pellet>

Component (A): Carbon black (Black Pearls 800®, a registered trademark in Japan, other countries, or both, specific surface area: 210 [$m^2/g$], the primary particle diameter: 17 nm, the oil absorption amount: 68 mL/100 g, manufactured by Cabot Corporation)

Component (B): GPPS (polystyrene 685®, a registered trademark in Japan, other countries, or both, manufactured by PS Japan Corporation)

Component (C): fatty acid amide (ethylene bis stearylamide) (Kao Wax EB•FF®, a registered trademark in Japan, other countries, or both, manufactured by Kao Corporation)

<Carbon Black>

Carbon black powder (Black Pearls 800®, specific surface area: 210 [$m^2/g$], the primary particle diameter: 17 nm, the oil absorption amount: 68 mL/100 g, manufactured by Cabot Corporation)

<Polyphenylene Ether (α)>

PPE-1: poly(2,6-dimethyl-1,4-phenylene ether) powder having reduced viscosity of 0.4 dL/g (measured at 30° C. using a 0.5 g/dL chloroform solution)

<Styrene Resin (β)>

GPPS-1: Pellet-shaped homopolystyrene (polystyrene 685®, manufactured by PS Japan Corporation)

<Styrene Thermoplastic Elastomer (γ)>

SEBS-1: Pellet-shaped styrene thermoplastic elastomer having a tri-block structure (styrene block-hydrogenated butadiene block-styrene block) having an amount of bound styrene of 65%, a number average molecular weight Mn of 50,000, and a weight average molecular weight Mw/the number average molecular weight Mn=1.12, and a hydrogenation rate of the butadiene block portion is 99.9%.

<Additives>

Phosphorus-based heat stabilizer (PEP-36): 3,9-bis(2,6-di-tert-butyl-4-methylphenoxy)-2,4,8,10-tetraoxa-3,9-diphosphaspiro[5,5]undecane (Adekastab PEP-36®, a registered trademark in Japan, other countries, or both, manufactured by Adeka Corporation)

The production examples of the carbon black master batch pellet used in the examples and the comparative examples will be described below.

Production Examples of Carbon Black Master Batch

Production examples 1 to 7 (CBMB1 to CBMB7) of the carbon black master batch were produced as follows.

Production Example 1 (CBMB1)

40.0 mass % of carbon black, 55.0 mass % of GPPS, and 5.0 mass % of fatty acid amide were mixed for three minutes with a Henschel mixer, and a Small Capacity Dispersion Kneader D3-20 manufactured by Moriyama Inc. was used to perform melt-kneading at a set temperature of 200° C. at a rotation speed of 60 rpm for 20 minutes.

The melt-kneaded product was extracted, a Feeder Ruder FR manufactured by Moriyama Inc. was immediately used to extrude the melt-kneaded product through a die diameter of 3 mmφ, and adjust the extrusion output and the cutter speed to obtain a flat pellet-shaped carbon black master batch having a pellet diameter (D) of 3.5 mm and a pellet length (L) of 1.5 mm.

The composition and the measurement results are listed in Table 1.

Production Examples 2 to 7 (CBMB2 to CBMB7)

The carbon black master batch pellets were produced in the same manner as Production example 1 using the carbon black, the GPPS, and the fatty acid amide used in Production example 1, except that the compounding ratios and the shapes of the master batch pellets listed in Table 1 were used.

In the production of CBMB2 to CBMB5, flat pellet-shaped carbon black master batch pellets having different pellet lengths (L) than Production example 1 were obtained by adjusting the extrusion output and the cutter speed.

In CBMB5 to CBMB7, the compounded amounts of the carbon black, the GPPS, and the fatty acid amide were changed to the compounding ratios listed in Table 1.

The composition and the measurement results are listed in Table 1.

TABLE 1

|  | Component (A) | Component (B) | Component (C) | Shape of masterbatch pellet | | |
|---|---|---|---|---|---|---|
|  | Carbon black [Mass %] | GPPS [Mass %] | Fatty acid amide [Mass %] | Pellet diameter (D) [mm] | Pellet length (L) [mm] | D/L [—] |
| CBMB1 | 40.0 | 55.0 | 5.0 | 3.5 | 1.5 | 2.33 |
| CBMB2 | 40.0 | 55.0 | 5.0 | 3.5 | 2.0 | 1.75 |
| CBMB3 | 40.0 | 55.0 | 5.0 | 3.5 | 3.0 | 1.17 |
| CBMB4 | 40.0 | 55.0 | 5.0 | 3.5 | 4.0 | 0.88 |
| CBMB5 | 45.0 | 55.0 | 0.0 | 3.5 | 1.8 | 2.00 |
| CBMB6 | 30.0 | 65.0 | 5.0 | 3.5 | 1.5 | 2.33 |
| CBMB7 | 60.0 | 40.0 | 0.0 | 3.5 | 3.0 | 1.17 |

Examples 1 to 5 and Comparative Examples 1 to 5

The black coloring—simultaneous compounding was performed to PPE-1, GPPS-1, SEBS-1, carbon black master batch pellet (CBMB1 to CBMB7), and PEP-36 in the compounded amounts listed in Table 2 using the twin screw extruder (TEM58SS) manufactured by Toshiba Machine Co., Ltd., to obtain the polyphenylene ether resin composition. In Comparative example 5, a carbon black powder was used instead of the carbon black master batch pellet.

The TEM58SS was set to a number of barrels of 13 and a screw diameter of 58 mm, and a screw pattern structure having 2 kneading discs L, 6 kneading discs R, and 3 kneading discs N as the screw parts. The cylinder set temperature was 280° C., a screw speed was 400 rpm, devolatilizing under reduced pressure from the position of barrel 10 (the most upstream barrel seen in the flow direction of the extruder was made as barrel 1) was performed at a vent vacuum degree of 8 kPa (60 Torr), and the pellet of a black colored resin composition was obtained at an output speed of 400 kg/Hr by a 20-hole die having hole diameter of 4 mmφ.

The raw materials were fed from the position of barrel 1, which is the most upstream barrel seen from the flow direction of the extruder via the following three feed systems.

Feed system 1: The feed system (the feed supply capacity range was 60 to 600 kg/Hr) of only a part (the remainder except for 10 parts by mass fed from Feed system 3) of the PPE-1 powder raw material.

Feed system 2: The feed system (the feed supply capacity range was 60 to 600 kg/Hr) of the pellet raw materials (GPPS-1 and SEBS-1). The GPPS-1 and the SEBS-1 pellet raw materials were filled in a feed hopper after being mixed for 20 minutes by a tumbler.

Feed system 3: The feed system (the feed supply capacity was 20 to 100 kg/Hr) of the powder mixture of a part (10 parts by mass) of PPE-1 powder raw material and PEP-36. PPE-1 and PEP-36 are powder raw materials, and were filled in a feed hopper after being premixed for two minutes by a super mixer.

The feeding positions (feed systems) of the carbon black master batches (CBMB1 to CBMB7) and the carbon black powder are as listed in Table 2. In this case, the carbon black master batch was premixed together with the other components of the same feed system.

[[Method of Producing the Molded Product]]

The obtained black colored pellet of the polyphenylene ether resin composition was dried using a 120° C. hot-air dryer for 3 hours. The resin composition after drying was molded by an injection molding machine (IS-80EPN, manufactured by Toshiba Machine Co., Ltd.) equipped with a specular mold with a film gate, having a surface polished by #5000 and a dimension of 100 mm×100 mm×2 mm (thickness), at a cylinder temperature of 320° C., a mold temperature of 120° C., an injection pressure (gauge pressure) of 70 MPa, and an injection velocity (panel setting value) of 85% to obtain a molded product.

The evaluation results are listed in Table 2.

TABLE 2

| | | | | Example 1 | Example 2 | Example 3 | Example 4 | Example 5 |
|---|---|---|---|---|---|---|---|---|
| Composition of Resin composition | Component (α) | PPE-1 (powder raw material) | [mass part] | 70.0 | 70.0 | 70.0 | 70.0 | 70.0 |
| | Component (β) | GPPS-1 (pellet raw material) | [mass part] | 18.0 | 18.0 | 18.0 | 18.0 | 18.0 |
| | Component (γ) | SEBS-1 (pellet raw material) | [mass part] | 12.0 | 12.0 | 12.0 | 12.0 | 12.0 |
| | Other resin components | PEP-36 (powder raw material) | [mass part] | 0.2 | 0.2 | 0.2 | 0.2 | 0.2 |
| | Carbon black master batch pellet | CBMB1 | [mass part] | 0.5 | 0.5 | 1.0 | — | — |
| | | CBMB2 | [mass part] | — | — | — | 1.0 | — |
| | | CBMB3 | [mass part] | — | — | — | — | — |
| | | CBMB4 | [mass part] | — | — | — | — | — |
| | | CBMB5 | [mass part] | — | — | — | — | 1.0 |
| | | CBMB6 | [mass part] | — | — | — | — | — |
| | | CBMB7 | [mass part] | — | — | — | — | — |
| | Carbon blade powder | Black pearls 800 | [mass part] | — | — | — | — | — |
| | Total | | [mass part] | 100.7 | 100.7 | 101.2 | 101.2 | 101.2 |
| | Feeding position of Carbon black masterbatch pellets or Carbon blade powder | | [—] | Feed system 2 | Feed system 3 | Feed system 2 | Feed system 2 | Feed system 2 |
| Physical properties of Resin composition | Appearance of molded product | Black density change | [—] | Good | Good | Good | Satisfactory | Good |
| | | Carbon black aggregate | [—] | Good | Good | Good | Good | Satisfactory |
| | Tensile elongation at break (TE) | | [%] | 11 | 13 | 12 | 13 | 8 |

| | | | | Comparative Example 1 | Comparative Example 2 | Comparative Example 3 | Comparative Example 4 | Comparative Example 5 |
|---|---|---|---|---|---|---|---|---|
| Composition of Resin composition | Component (α) | PPE-1 (powder raw material) | [mass part] | 70.0 | 70.0 | 70.0 | 70.0 | 70.0 |
| | Component (β) | GPPS-1 (pellet raw material) | [mass part] | 18.0 | 18.0 | 18.0 | 18.0 | 18.0 |
| | Component (γ) | SEBS-1 (pellet raw material) | [mass part] | 12.0 | 12.0 | 12.0 | 12.0 | 12.0 |
| | Other resin components | PEP-36 (powder raw material) | [mass part] | 0.2 | 0.2 | 0.2 | 0.2 | 0.2 |
| | Carbon black master batch pellet | CBMB1 | [mass part] | — | — | — | — | — |
| | | CBMB2 | [mass part] | — | — | — | — | — |
| | | CBMB3 | [mass part] | 1.0 | — | — | — | — |
| | | CBMB4 | [mass part] | — | 1.0 | — | — | — |
| | | CBMB5 | [mass part] | — | — | — | — | — |
| | | CBMB6 | [mass part] | — | — | 1.0 | — | — |
| | | CBMB7 | [mass part] | — | — | — | 1.0 | — |
| | Carbon blade powder | Black pearls 800 | [mass part] | — | — | — | — | 0.4 |
| | Total | | [mass part] | 101.2 | 101.2 | 101.2 | 101.2 | 100.6 |
| | Feeding position of Carbon black masterbatch pellets or Carbon blade powder | | [—] | Feed system 2 | Feed system 2 | Feed system 2 | Feed system 2 | Feed system 3 |
| Physical properties of Resin composition | Appearance of molded product | Black density change | [—] | Poor | Poor | Poor | Good | Good |
| | | Carbon black aggregate | [—] | Good | Good | Good | Poor | Poor |
| | Tensile elongation at break (TE) | | [%] | 10 | 12 | 11 | 6 | 7 |

As listed in Table 2, the molded products having a specular black external appearance having almost no change in the black concentration, a stable external appearance, and, almost no carbon aggregates on the surface were obtained in Examples 1 to 5.

Further, when the carbon black master batch pellet of the present disclosure was used, an improvement of the elongation at break was recognized, which is considered to be an effect due to the improvement of the dispersibility of the carbon black.

INDUSTRIAL APPLICABILITY

The carbon black master batch pellet of the present disclosure can provide black coloring compounded manufactured goods having a stable black coloring concentration, in the case when mainly performing the black coloring—simultaneous compounding, by suppressing classification even if compounded in any raw material system such as a pellet-shaped raw material system or a powder raw material system, the carbon black is adequately dispersed, and can obtain a molded product having an excellent black external appearance.

The invention claimed is:

1. A pellet comprising
35 to 55 mass % of carbon black (A),
65 to 45 mass % of a thermoplastic resin (B), and
0.1 to 10 mass % of a dispersant assistant (C), wherein a diameter (D) in a direction orthogonal to the axial direction is 2 to 5 mm, and a ratio (D/L) of the diameter (D) to a length (L (mm)) in the axial direction is 3.0 to 1.5.

2. The pellet according to claim 1, wherein the carbon black (A) has a primary particle diameter of 10 to 30 nm, and an oil absorption amount of 50 to 150 mL/100 g.

3. The pellet according to claim 2, wherein the thermoplastic resin (B) is a styrene resin.

4. The pellet according to claim 3, wherein the dispersant assistant (C) is an aliphatic amide.

5. The pellet according to claim 2, wherein the dispersant assistant (C) is an aliphatic amide.

6. The pellet according to claim 1, wherein the thermoplastic resin (B) is a styrene resin.

7. The pellet according to claim 6, wherein the dispersant assistant (C) is an aliphatic amide.

8. The pellet according to claim 1, wherein the dispersant assistant (C) is an aliphatic amide.

9. The pellet according to claim 1, wherein a shape of the pellet is columnar.

10. The pellet according to claim 9, wherein the shape of the pellet is a circular column.

11. The pellet according to claim 9, wherein the shape of the pellet is an elliptical column.

12. The pellet according to claim 9, wherein the shape of the pellet is a polygonal column.

* * * * *